UNITED STATES PATENT OFFICE.

JOSEPH SCHOENFELD AND ANDRÉ R. GUILMET, SR., OF PARIS, FRANCE.

IMPROVEMENT IN THE MANUFACTURE OF RUBBER ARTICLES TO IMITATE BRONZE, &c.

Specification forming part of Letters Patent No. 211,795, dated January 23, 1879; application filed December 2, 1878.

*To all whom it may concern:*

Be it known that we, JOSEPH SCHOENFELD and ANDRÉ ROMAIN GUILMET, Sr., of Paris, France, manufacturers, have invented a new and useful method in the manufacture of articles in imitation of bronze with hollow india-rubber, hardened, coppered, or galvanized, and bronzed, gilded, plated, or otherwise decorated; and we do hereby declare that the following is a full and exact description thereof.

Our invention has for its object the manufacture of objects imitating the bronze of art in hollow hardened india-rubber, coppered over by the electro-metallurgy, or every other process able so to receive nickel-plating, gilding, silver-plating, bronzing, and other kinds of decoration.

It consists in first molding the object to the precise form desired in soft india-rubber by the ordinary means. After that it is hardened completely by the usual processes for this purpose. The object thus molded is then scraped, polished, and also carved, if its nature admits of it, then cleaned, in order to give it a good, correct surface. It is afterward done over with black lead, or other method analogous to that usually done in the processes of electro-metallurgy, for rendering it conductive, and consequently fit to receive the galvanic deposit. The object is conveyed into the bath, where it is galvanized according to the usual conditions of electro-metallurgy. There is thus obtained over the whole surface of the object a deposit, more or less thick, of red or yellow copper; or even in proceeding by fractions of its surface there can be obtained parts of the deposit red and parts of the deposit yellow, according to the nature of the object. The object thus treated can be then bronzed by the usual processes, and thus are obtained perfect imitations of objects in bronze; or they may be decorated by all the ordinary processes of nickel-plating, silver-plating, gilding, bronzing, and others.

The articles thus produced, besides having all the appearance of bronze, nickel, gilt, or silver, have the advantage of being very light and cheap. They are solid, and sufficiently elastic to bear repeated blows without being bruised.

It is understood that we can produce by this process all kinds of objects—such as statues, groups, vases, lamps, and numerous others.

As a proof of the importance of our invention, if it is desired to produce a group in solid hardened india-rubber, the material being costly, the price at which it can be sold is higher than that of bronze; but if produced in hollow hardened and thin india-rubber, it can be sold at even a lower price than the zinc. Again, the hollow india-rubber being produced by an expansion of air in the interior of the object, the details of the mold are perfectly reproduced, and when afterward the india-rubber is hardened and bronzed it unites perfectly the groups.

We claim as our invention—

The manufacture of objects imitating bronze of art in hollow india-rubber, hardened, coppered over by the electro-metallurgy or other process, and gilded, bronzed, nickel-plated, or silver-plated, substantially as hereinbefore described.

In testimony whereof we have signed our names to this specification before two subscribing witnesses.

J. SCHOENFELD.
A. R. GUILMET, Sr.

Witnesses:
DAVID T. S. FULLER,
ALBERT COHEN.